US008421649B2

(12) United States Patent
Marstall et al.

(10) Patent No.: US 8,421,649 B2
(45) Date of Patent: Apr. 16, 2013

(54) AIRCRAFT ATTITUDE SYSTEMS

(76) Inventors: Jerry Lee Marstall, Asheville, NC (US); Shakeel Mozaffar, Ocala, FL (US)

( * ) Notice: Subject to any disclaimer, the term of this patent is extended or adjusted under 35 U.S.C. 154(b) by 242 days.

(21) Appl. No.: 13/031,370

(22) Filed: Feb. 21, 2011

(65) Prior Publication Data

US 2011/0205090 A1    Aug. 25, 2011

Related U.S. Application Data

(60) Provisional application No. 61/306,654, filed on Feb. 22, 2010, provisional application No. 61/309,595, filed on Mar. 2, 2010.

(51) Int. Cl.
    *G01C 23/00*   (2006.01)
(52) U.S. Cl.
    USPC ............... 340/975; 340/967; 340/974; 701/4; 701/14
(58) Field of Classification Search .................. 340/967, 340/971–975, 979, 980; 701/4, 9, 14
    See application file for complete search history.

(56) References Cited

U.S. PATENT DOCUMENTS

| 3,571,938 | A |   | 3/1971  | Branick |   |
|-----------|---|---|---------|---------|---|
| 3,852,710 | A |   | 12/1974 | Hernandez, Jr. |   |
| 3,970,829 | A | * | 7/1976  | Melvin ............................ | 701/6 |
| 4,044,059 | A |   | 8/1977  | Copelin |   |
| 4,193,059 | A |   | 3/1980  | Harris |   |
| 4,247,843 | A | * | 1/1981  | Miller et al. .................. | 340/973 |
| 4,583,094 | A | * | 4/1986  | Mosier .......................... | 340/975 |
| 5,095,746 | A | * | 3/1992  | Stanis .......................... | 73/178 R |
| 5,185,606 | A | * | 2/1993  | Verbaarschot et al. ....... | 340/961 |
| 6,405,107 | B1 |  | 6/2002  | Derman |   |
| 7,295,135 | B2 | * | 11/2007 | Younkin ....................... | 340/971 |
| 7,482,951 | B1 |  | 1/2009  | Brungart |   |
| 2009/0121901 | A1 | * | 5/2009 | Namier et al. ............... | 340/975 |
| 2010/0141482 | A1 | * | 6/2010 | Wyatt et al. .................. | 340/975 |

FOREIGN PATENT DOCUMENTS

| EP | 0116022 | 8/1984 |
| EP | 1470391 | 10/2004 |

OTHER PUBLICATIONS

English Abstract of EP1470391, Oct. 2004.

* cited by examiner

*Primary Examiner* — Brent Swarthout
(74) *Attorney, Agent, or Firm* — McClure, Qualey & Rodack, LLP

(57) ABSTRACT

Aircraft attitude systems are provided, in which a representative system includes: an instrument face having a bank angle scale, a bank status indicator, a pitch angle scale and a pitch status indicator; the bank angle scale being fixed in position relative to the instrument face and being operative to present increments of bank angle of an aircraft; the bank status indicator being operative to move relative to the bank angle scale such that a current aircraft bank angle is indicated; the pitch angle scale being fixed in a vertical orientation relative to the instrument face and being operative to present increments of pitch angle of an aircraft; the pitch status indicator being operative to move relative to the pitch angle scale such that a current aircraft pitch angle is indicated.

31 Claims, 7 Drawing Sheets

AIRCRAFT ATTITUDE SYSTEMS

CROSS REFERENCE TO RELATED APPLICATIONS

This utility application claims priority to U.S. Provisional Patent Application 61/306,654, filed on Feb. 22, 2010, and U.S. Provisional Patent Application 61/309,595, filed on Mar. 2, 2010, each of which is incorporated by reference herein in its entirety.

BACKGROUND

1. Technical Field

The disclosure relates to aircraft instruments.

2. Description of the Related Art

The "artificial horizon" (attitude indicator) was invented by Mr. Sperry and first flown by Jimmy Doolittle in 1929. It continues to be the primary flight instrument when the discernable horizon is not visible. It is also the primary instrument pilots depend upon to extricate themselves when a loss of situational awareness leads to spatial disorientation. All pilots, student pilots to professional and military pilots, are susceptible to spatial disorientation. Current aviation accident statistics indicate that prior art attitude indicator instrumentation continues to be insufficient to protect pilots from the hazards of spatial disorientation. Federal Aviation Agency statistics indicate that 15-17% of all aviation accidents, which includes commercial airlines, are the result of spatial disorientation and 90% of these accidents are fatal. Spatial disorientation is the military's number one cause of fatal accidents.

The leading cause of fatal aircraft accidents is Loss of Control in Flight (LOC-I). Boeing's 2009 Statistical Summary of Worldwide Commercial Jet Fleet Fatal Accidents—2000 through 2009, reports a total of 5001 fatalities. 22% of the accidents and 35% of the fatalities were attributed to LOC-I. As titled, this report includes only commercial jet aircraft and excludes non-jet commercial aircraft as well as general aviation and military LOC-I related accidents. In addition, examples of documented occurrences of LOC-I events that were successfully recovered typically go unreported. Therefore, in reality, the actual number of LOC-I incidences, is likely much greater.

LOC-I typically begins with a pilot's loss of awareness of the aircraft's bank attitude referred to as "Loss of Situational Awareness". Situational Awareness is a comparison of an individual's perceptions of a situation to reality. Loss of situational awareness typically begins with an insidious slow banking, undetected by the pilot's inner ear. The pilot remains unaware that the aircraft is turning, believing that the aircraft is maintaining straight and level flight.

At some point, the pilot suddenly becomes aware that his perception of the aircraft's attitude is in disagreement with the aircraft's instrumentation. This realization of the conflict can quickly cause the onset of pilot spatial disorientation. Without proper and immediate recognition of the presence of spatial disorientation and the aircraft's real situation, and without immediate aircraft attitude corrective controls input, the aircraft can rapidly progress to an unrecoverable attitude.

Even the best of pilots will quickly become disoriented if they attempt to fly without instruments when there are no outside visual references. This is because vision provides the predominant sense we rely upon for spatial orientation. Therefore, spatial disorientation most commonly occurs when the horizon or other outside references are obscured, such as when clouds, haze, fog, snow or darkness are present. Loss of ability to determine position of the aircraft via the horizon can lead to disorientation and severe loss of flight control with potentially fatal results. The attitude indicator is the primary flight instrument for maintaining aircraft control in these conditions. Instrument flight training instructs pilots in coping with spatial disorientation. However, an instrument rating does not make a pilot immune to spatial disorientation and its potential for disaster.

Spatial Disorientations is categorized in three types:

TYPE I (Unrecognized): The pilot is oblivious to his disorientation, and controls the aircraft completely in accord with and in response to a false orientation percept. The pilot may believe he is flying level while actually in a banking dive, unaware of being within just seconds from a fatal crash. The pilot depends upon the attitude indicator to preclude the onset of Type I spatial disorientation. According to NATO, *Report RTO-TR-HFM*-118, pp 1.1, JUNE '07, "From the RAF and USAF SD (Spatial Disorientation) mishaps about 80% are Type I, i.e. unrecognized spatial disorientation."

Statistics indicate that prior art has not effectively addressed or arrested Type I spatial disorientation.

TYPE II (Recognized): The pilot may experience a conflict between what he feels the aircraft is doing and what flight instruments show. Such confusion can cause a pilot to delay corrective action or initiate incorrect controls input, exacerbating the already dangerous situation. Again, the attitude indicator is the primary flight instrument for determining and verifying the attitude of the aircraft. Difficulty in interpreting the attitude of the aircraft jeopardizes the ability to initiate a recovery. Statistics indicate that prior art attitude indicators lend themselves to confusion and misinterpretation during occurrences of Type II spatial disorientation. According to NATO, *Report RTO-TR-HFM*-118, pp 1.2 JUNE '07, "20% of the SD mishaps involve recognized SD (Type II), where pilots know they are disoriented, but cannot equate the conflict between instrument readings and perceived motion and/or attitude."

TYPE III (Incapacitating): The pilot experiences the most extreme form of disorientation stress. The pilot may be aware of the disorientation, but unsuccessful attempts to determine the aircraft's attitude leaves the pilot mentally and physically overwhelmed to the point he is unable to successfully recover from the situation. He may freeze at the controls, or make control inputs that tend to exacerbate the situation rather than affect recovery. The inability to quickly and properly interpret the attitude indicator display can cause a pilot to succumb to Type III spatial disorientation.

Three Critical Steps for successfully combating the perils of spatial disorientation:

Critical Step 1: The pilot must recognize, in advance, conditions that may lead to loss of situational awareness and spatial disorientation.

Critical Step 2: The pilot must properly interpret the aircraft's instrumentation to determine aircraft attitude in order to initiate appropriate corrective action.

Critical Recovery Step 3: The pilot must apply aircraft controls correctly to affect a recovery.

Prior art attitude indicators do not provide pilot assistance relative to Critical Step 1. In particular, prior art attitude indicators tend to exhibit inherent ergonomic design flaws that may compromise a pilot's ability to comply with Critical Step 2. Without certain ability to properly comply with Critical Steps 1 and 2, the ability to perform Critical Step 3 is left in the hands of the divine.

Through numerous generations of development, many of the operational design deficiencies of the prior art have been addressed. Notably, the advent of solid state technology with solid state accelerometers and gyroscopes have adequately addressed many of the limitations of vacuum and electric/mechanical gyroscopes, such as gimble lock, which manifests itself as a tumbling attitude indicator at steep banks, nose high and nose low attitudes. However, the ergonomic deficiencies of the original design have not been successfully addressed. These deficiencies tend to manifest themselves in pilot confusion and often misinterpreted referencing of unanticipated pitch and bank attitudes.

It is generally understood that the tendency to misinterpret bank angle presentations increases as the aircraft's attitude departs further and further from wings level flight and level pitch. Therefore, upon the encroachment of an unanticipated attitude, at the time when dependency on the pilot's proper interpretation of the aircraft's attitude is most critical, when rapid and accurate aircraft controls input are paramount to execute a proper recovery, current attitude indicator presentations tend to further confuse and disorient pilots.

The uncertainty of consistently being able to accurately interpret an aircraft's attitude, such as during a loss of situational awareness and impending spatial disorientation event, can confuse and even mentally and physically paralyze a pilot as in Type III Spatial Disorientation. Contributing to the possibility of Type III Spatial Disorientation is the unsettling sight of watching the attitude indicator spin or tumble in steep pitch and/or bank attitudes, making it virtually impossible to determine the precise attitude of the aircraft and what corrective action is required to recover to level flight.

Much of the confusion related to the prior art has been introduced in attempts to overcome past ergonomic deficiencies. Over time, two attitude indicator presentations have evolved in attempts to mitigate attitude indicator misinterpretation. Unfortunately, these attempts have resulted in potentially dangerous and conflicting inconsistencies between how each represents the horizon and its correlation to bank angles, bank pointer, pitch angle and aircraft symbol.

(Prior Art FIG. 1). This design, referred to as "Outside-In" or "Moving Plane—MP" embodies an artificial horizon line midway between the top and bottom of the instrument face. The horizon line and bank scale are fixed in position. The bank pointer moves in concert with aircraft banking. When the aircraft banks 20-degrees right, the bank scale remains fixed while the bank pointer rotates to the 20-degrees right bank scale index. The bank pointer represents both direction and magnitude of bank.

(Prior Art FIG. 2). The alternative presentation, referred to as "Inside-Out" or "Moving Horizon—MH" embodies an artificial horizon line midway between the top and bottom of the instrument face that responds to aircraft bank. The bank pointer moves in concert with the horizon. The bank scale is fixed in position and the aircraft symbol is fixed in the wings level position. When the aircraft banks 20-degrees right, the bank pointer rotates left positioning the bank pointer to the 20-degree left bank scale index. The bank pointer represents magnitude of bank correctly, but displays the bank in the direction opposite of the actual aircraft bank attitude.

These two attitude indicator presentations place the "bank pointers" in direct conflict with each other as to the direction the aircraft is banking. The potential for pilot confusion is obvious. Such confusion can be catastrophic. Many pilots admit to misinterpreting (and numerous studies confirm that pilots often misinterpret) banking attitudes as presented on prior art attitude indicators, resulting in control inputs in a direction opposite that required to correct the bank, exacerbating the situation. The technique adopted by many pilots is to "jiggle" the ailerons control in the perceived-to-be-correct direction while monitoring the resulting attitude change. If the aircraft responds in the desired direction, the pilot continues with that particular control input. If, however, the attitude moves in the direction opposite of that desired, the pilot reverses control input. Valuable recovery time is lost attempting to ascertain aircraft attitude and appropriate control inputs when using such a technique.

Confusion created by conflicting designs is magnified when:

The pilot is not instrument rated but finds himself in meteorological conditions requiring transition to the attitude indicator to maintain aircraft control.

The pilot is instrument rated but no longer proficient and finds himself in meteorological conditions requiring transition to the attitude indicator to maintain aircraft control.

The pilot is relatively new to a specific aircraft and has not had sufficient time to become proficient with the type of attitude indicator installed, (MP or MH).

The pilot flies several aircraft that may have either or both types of attitude indicators installed. A particular aircraft has one type attitude indicator as the primary and the other type as the backup attitude indicator.

The pilot is attempting to recover from a spatial disorientation event.

Anytime the pilot is in a stressful situation that requires the use of the attitude indicator to ensure safety of flight.

Prior art FIGS. 3 and 4 are both of an aircraft in a 20-degree nose down, 130-degree right bank. These figures provide vivid illustrations of the differences between the presentations of present day, prior art attitude indicators, with FIG. 3 using an MP-type indicator, and FIG. 4 using an MH-type indicator. Notably, these indicators provide significantly different images that can cause the pilot obvious confusion; delaying or precluding a pilot's corrective action to bank and pitch excursions. To compensate for these deficiencies and ensure proper interpretation of and response to present state of the art attitude indicator presentations, the pilot oftentimes indulges in numerous cockpit instrument comparative observations, analysis and conclusions before initiating action. When relying on the prior art attitude indicator for aircraft control, five Time-Critical questions typically are answered by deciphering the attitude indicator presentation:

1. Is the aircraft banked left or right?
  2. Is the aircraft pitched up or down?
  3. Is the aircraft upright or inverted?
  4. What are the appropriate aircraft control inputs to initiate the proper correction?
  5. Are the initial conclusions and resulting actions correct?

More recent attempts to resolve ergonomic deficiencies have been limited to incorporating color into traditional presentations on modernized displays of Electronic Flight Instrument Systems (EFIS). Beautification of old technology presentations has failed to make the attitude indicator more intuitive or a safer flight instrument. Arguably, the increased amount of data displayed on EFIS's, concurrent with the prior art attitude indicator display, can further compromise the pilot's ability to effectively interpret displayed information, particularly in adverse attitudes.

The ergonomic problems that compromise flight safety (and that are often the contributory cause of aircraft accidents) reside with the traditional presentation of aircraft attitude relative to the horizon. All prior art designs are anchored to the concept of presenting the artificial horizon as the basis of aircraft attitude reference. Attempts to simultaneously overlay pitch, bank and aircraft symbology on an artificial horizon (all of which are in an unstable state), have proven to be ineffective. Prior attempts to replicate a pilot's eye view of the horizon on an attitude instrument face have proven to generate confusion and aircraft attitude misinterpretation. Confusion occurs because prior art attitude indicators present the pilot with gyrating visual information that conflict with pilot sensations, as during spatial disorientation events. For instance, the pitch scale moves up and down, and rotates with bank changes, all in relation to an artificial horizon line that may also be moving. Depending on the particular prior art design, the bank pointer and aircraft symbol may be in a continuous state of movement as well. The very instrument that is supposed to provide clarity concerning aircraft attitude, due to inherent ergonomic deficiencies, actually promotes confusion, misinterpretation and perilous loss of aircraft control.

Present dogma is that the only defense against erroneous readings of aircraft attitude from an artificial horizon display (Prior Art) is better training. The aforementioned statistics tend to indicate that this strategy has failed.

SUMMARY

Aircraft attitude systems are provided. An exemplary embodiment of such a system comprises: an instrument face having a bank angle scale, a bank status indicator, a pitch angle scale and a pitch status indicator; the bank angle scale being fixed in position relative to the instrument face and being operative to present increments of bank angle of an aircraft; the bank status indicator being operative to move relative to the bank angle scale such that a current aircraft bank angle is indicated; the pitch angle scale being fixed in a vertical orientation relative to the instrument face and being operative to present increments of pitch angle of an aircraft; the pitch status indicator being operative to move relative to the pitch angle scale such that a current aircraft pitch angle is indicated.

Other systems, methods, features and/or advantages will be or may become apparent to one with skill in the art upon examination of the following drawings and detailed description. It is intended that all such additional systems, methods, features and/or advantages be included within this description and be within the scope of the present disclosure.

BRIEF DESCRIPTION OF THE DRAWINGS

Many aspects of the disclosure can be better understood with reference to the following drawings. The components in the drawings are not necessarily to scale. Moreover, in the drawings, like reference numerals designate corresponding parts throughout the several views.

DETAILED DESCRIPTION

The inherent weaknesses in the overall design of prior art systems that contribute to false interpretation by pilots is seemingly due to reliance on dynamic symbology where all variables in the display may be in simultaneous and often conflicting motion. In other words, the artificial sky reference, the artificial horizon reference, the artificial ground reference, the bank pointer, the pitch ladder and the aircraft symbol may be moving, resulting in information overload, pilot confusion, slower and repetitively incorrect control inputs.

In this regard, embodiments of aircraft attitude systems may provide the revolutionary capability for a pilot to reduce exposure to loss of situational awareness by providing an effective instrument for combating spatial disorientation and the ability to manually maintain aircraft control without the use of an artificial horizon.

In some embodiments, one or more of various capabilities can be provided that assist in preventing pilot spatial disorientation, including: dynamic pitch attitude (e.g., color changing segmented column tape that illuminates from green to yellow to red) that alerts pilots as pitch attitude increasingly deviates from level flight attitude; dynamic bank attitude (e.g., color changing segmented perimeter warning-bands that illuminate green to yellow to red) that alerts pilots as bank attitude increasingly deviates from wings level flight attitude; visual pilot directives for returning aircraft pitch and bank to level flight attitudes; and verbal pilot directives for returning aircraft pitch and bank to level flight attitudes.

Figure 1:
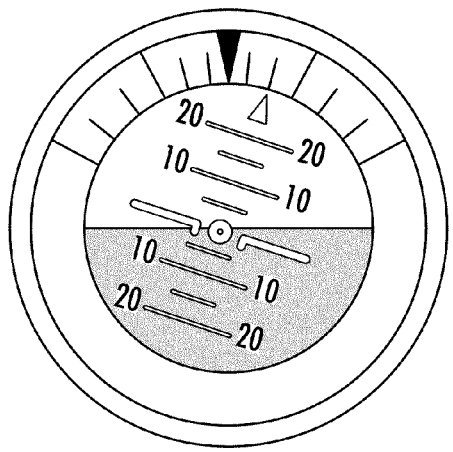
FIG. 1 depicts a prior art instrument face of a Moving Plane (MP), Outside-In attitude indicator that is indicating a right turn.
Figure 2:
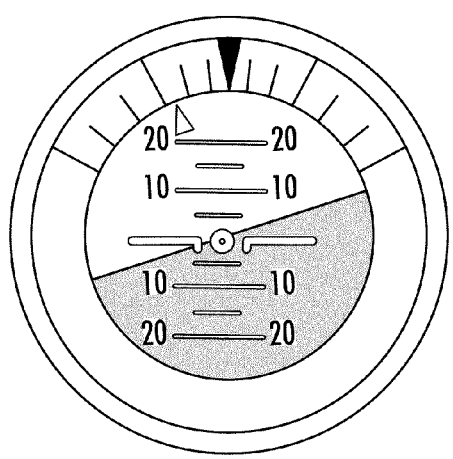
FIG. 2 depicts a prior art instrument face of a Moving Horizon (MH), Inside-Out attitude indicator that is indicating a right turn.
Figure 3:
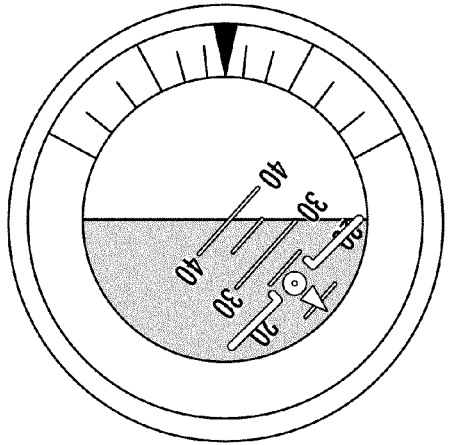
FIG. 3 depicts a prior art instrument face of an MP attitude indicator that is indicating inverted flight.
Figure 4:
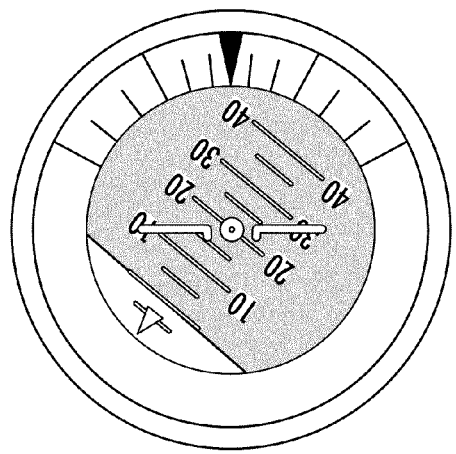
FIG. 4 depicts a prior art instrument face of an MH attitude indicator that is indicating inverted flight.
Figure 5:
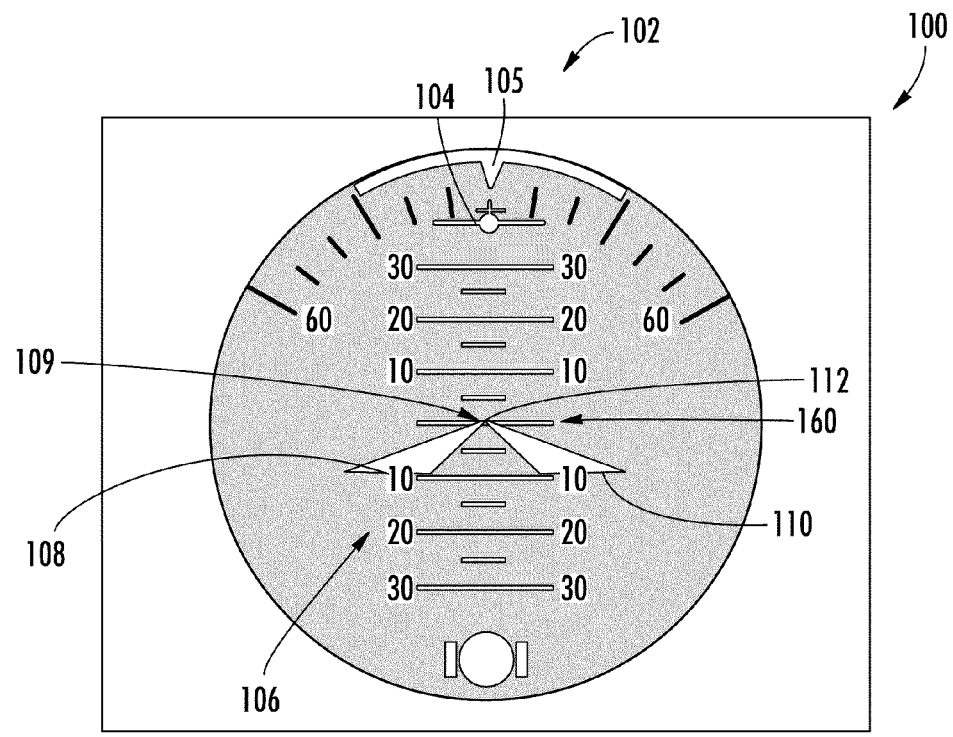
FIGS. 5-10 schematically depict an exemplary embodiment of an aircraft attitude system.

Referring now in more detail to the drawings, FIGS. 5-10 depict an exemplary embodiment of an aircraft attitude system. As shown in FIG. 5, an instrument face 100 of the system provides a bank angle scale 102, a bank status indicator 104, a pitch angle scale 106 and a pitch status indicator 108. Note that the instrument face of this embodiment does not display an artificial horizon.

Bank angle scale 102 is fixed in position relative to the instrument face and presents increments of bank angle of an aircraft (e.g., an aircraft in which the instrument face is mounted). In this case, 30° increments of left and right bank up to 90° are marked on the scale, with 10° increments additionally being marked below left and right bank angles of 60°.

Figure 8:
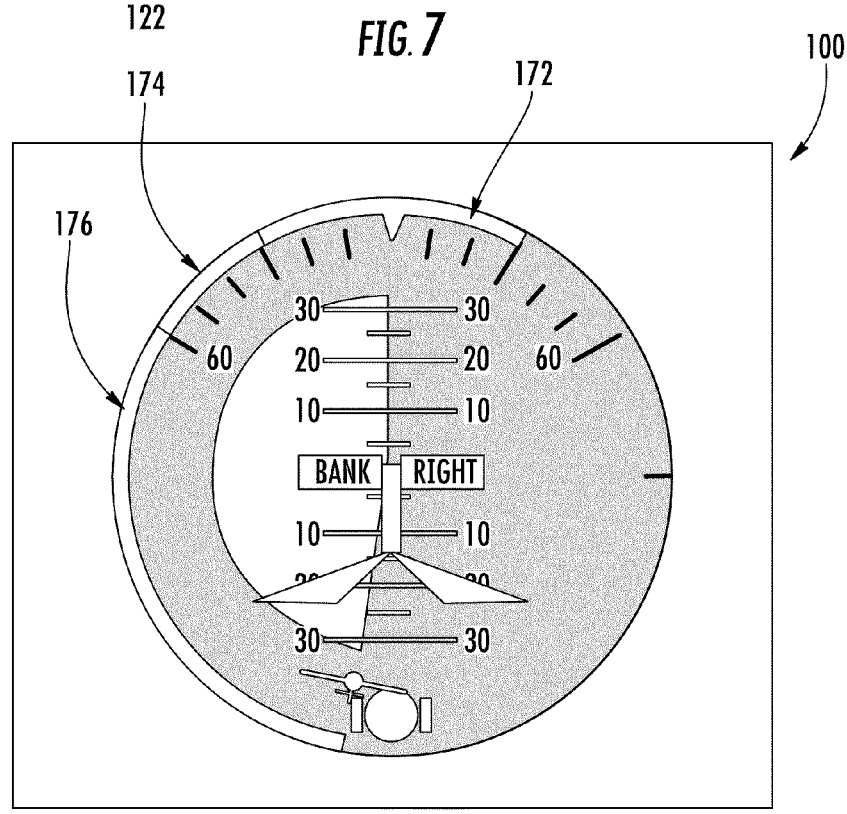
Figure 9:
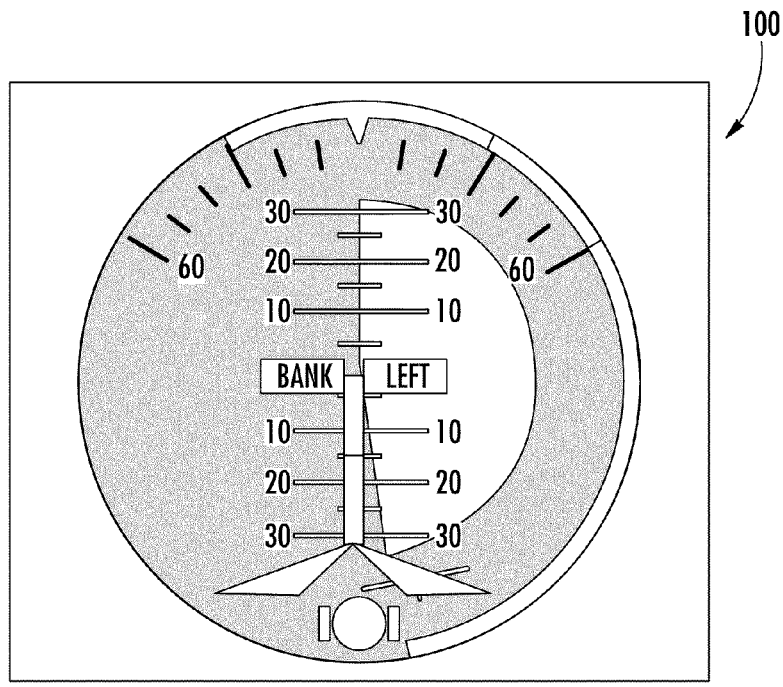

Bank status indicator 104 is operative to move relative to the bank angle scale so that a current aircraft bank angle is indicated. In this embodiment, indicator 104 is configured as a rear silhouette of an aircraft that moves in proximity to the bank angle scale responsive to a sensed aircraft bank angle. Specifically, the indicator 104 moves as if pivoting about a point 109 of the instrument face. As such, the bank angle of the aircraft is mimicked by the bank angle exhibited by the indicator. For instance, as shown in FIG. 8, the indicator 104 is nearly inverted relative to the fixed bank and pitch angle scales, which corresponds to the aircraft to which the system is responding being nearly inverted.

A bank stabilization index 105 is fixed in position at top center along the bank angle scale. Index 105 represents a "zero" bank, wings-level aircraft attitude when bank status indicator 104 is vertically aligned with the index.

Figure 7:
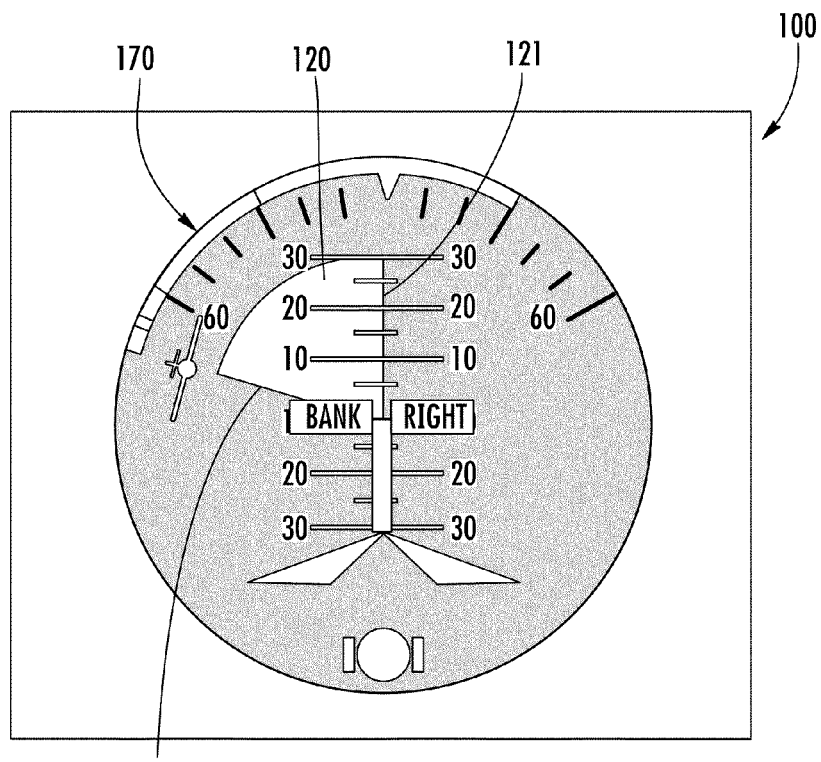

As shown in FIG. 7, system 100 also includes a bank magnitude indicator 120. Indicator 120 is configured as an extendable sector, with a first radius 121 of the sector being located in a vicinity of 0° bank angle on the bank angle scale and a second radius 122 being located in a vicinity of the current aircraft bank angle. When presented, such as responsive to a deviation of the current aircraft bank angle from a predetermined bank angle (e.g., 0° bank angle), at least a portion of the sector exhibits a color that contrast with adjacent portions of the display. Thus, as the aircraft bank angle increases, the size of the sector increases. This can be seen by comparing the sector size in FIGS. 7 and 8, for example.

Pitch angle scale 106 (FIG. 5) is fixed in a vertical orientation relative to the instrument face (i.e., the pitch scale does not rotate relative to the instrument face responsive to changes in aircraft bank) and present increments of pitch angle of an aircraft. In this embodiment, the upper portion 107 of the scale 106 displays a scrolling range of pitch angles (e.g., 30° of pitch) to maintain 10° of pitch scale ahead of the aircraft pitch maneuver. Thus, during a pitch-up maneuver, once 30° of pitch is attained, the upper portion of the scale would display major degree increments of 20°, 30° and 40° nose-up pitch. This scrolling happens while the lower portion 109 of the pitch scale remains static. Similarly, during pitch-down maneuvers, the lower portion of the scale scrolls while the upper portion remains static. Notably, scrolling of the pitch angle scale can be adapted to a variety of preferences. However, regardless of the scrolling methodology used, scale 106 maintains its vertical orientation.

In the embodiment of FIGS. 5-10, the bank angle scale defines, at least in part, a first perimeter of the instrument face and the pitch angle scale is positioned within the first perimeter.

Pitch status indicator 108 is operative to move relative to the pitch angle scale so that a current aircraft pitch angle is indicated. In this embodiment, indicator 108 is configured as a chevron 110 with an apex 112. The apex indicates the current aircraft pitch angle along the pitch angle scale. Notably, regardless of the aircraft bank angle, the chevron in this embodiment remains upright (apex pointing up) while moving vertically along the pitch angle scale.

Pitch status indicator also includes a pitch deviation guide 114 (FIG. 6) that is configured as an extendable tape originating in a vicinity of 0° pitch angle on the pitch angle scale. Guide 114 terminates in a vicinity of the apex so that a length of the pitch deviation guide changes responsive to changes in aircraft pitch.

In some embodiments, such as that depicted in FIGS. 5-10, pitch status indicator incorporates different colors that represent degree of departure from a predetermined pitch angle (e.g., 0° pitch angle). For instance, in the depicted embodiment, three color segments (132, 134, 136) of pitch deviation guide 114 are provided. The color segments 132, 134 and 136 are green, yellow and red, respectively, with each corresponding to a predetermined range of pitch angles. As shown most clearly in FIG. 9, segment 132 spans from 0°-15° pitch angle, segment 134 spans from 15°-30° pitch angle, and segment 136 spans from 30° pitch angle and beyond (both in the pitch-up and pitch down directions). Additionally, chevron 110 exhibits a color that corresponds to the color of the segment that is currently displayed most distant from the 0° pitch angle.

The embodiment of FIGS. 5-10 also incorporates a yaw deviation indicator 140. Indicator 140, which is configured as a ball 141 that move relative to reference marks 143, 145, displays a deviation of the current aircraft yaw angle from a predetermined yaw angle. Notably, a centered position of the ball between the marks indicates 0° yaw angle deviation.

In operation, system 100 provides a display as shown in FIG. 5 when the aircraft is in wings level flight at 0° pitch angle. Note that pitch status indicator is positioned at the bank stabilization index along the bank angle scale, that the chevron of the pitch status indicator is positioned at 0° pitch angle along the pitch angle scale and is green, and that ball of the yaw deviation indicator is centered between the marks.

Figure 6:
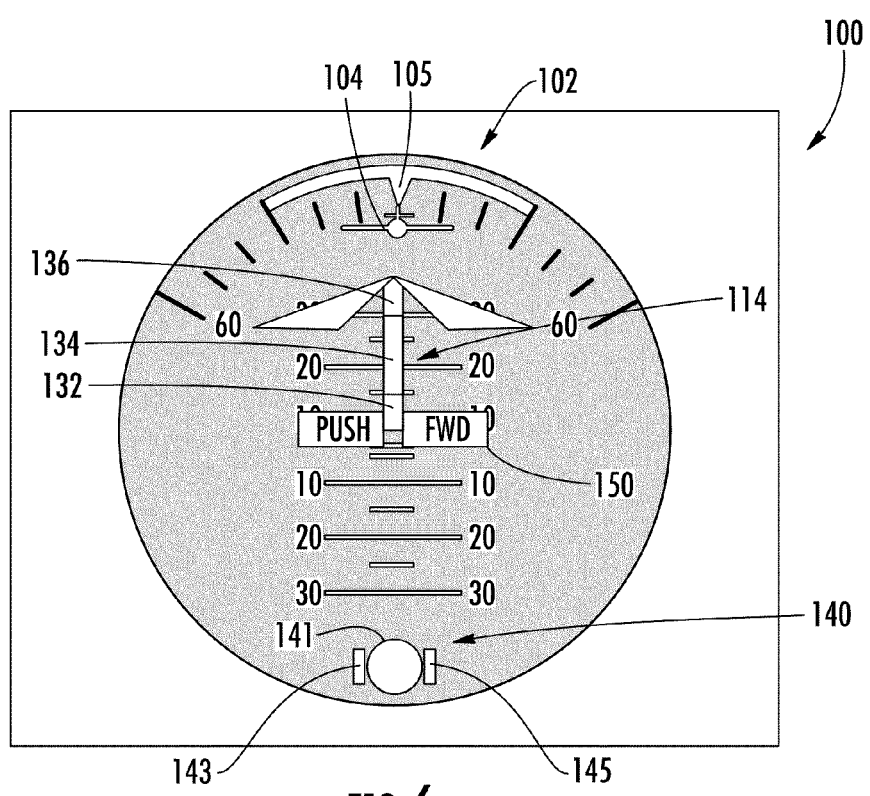

FIG. 6 illustrates system 100 when the aircraft is at 37° nose-up pitch angle and 0° bank. Note that the three colored segments of the pitch deviation guide are displayed and the chevron exhibits the color red to match that of the outermost displayed segment. Note also that attitude correction commands (e.g., "PUSH FWD") are displayed in windows 150 to provide an indication of recommended corrective pilot inputs to the flight controls to return the aircraft to wings level flight at 0° pitch angle. In some embodiments, attitude correction commands can be replaced and/or accompanied by voice commands as will be described later.

In excess of 30° pitch up attitude, the system can anticipate a rapid decrease in airspeed and impending stall condition. In some embodiments, the system procedure for recovery from extreme pitch up attitudes is to command the aircraft to: bank towards the closest 90° bank angle allowing the nose of the aircraft to descend towards a pitch level attitude; roll wings level; and recover aircraft pitch to level flight. To accomplish this maneuver, the attitude correction commands (e.g., displayed in windows 150) indicate "BANK LEFT" or "BANK RIGHT", and a complementary voice correction command, "Bank Left to 90-degrees" or "Bank Right to 90-degrees" is enunciated. As the aircraft bank attitude reaches a predetermined bank angle (e.g., 80° of bank), a voice command of "Stop Bank" can be issued, informing the pilot to neutralize aileron controls to stabilize bank at approximately 90°. The visual and aural commands can be repeated until the nose of the aircraft descends below 30° of pitch. Below 30° of pitch, the attitude correction command window can provide standard roll attitude correction commands, as the voice commands continue providing aural attitude corrections. Note that such a procedure does not apply to extreme nose down pitch attitudes.

In some embodiments, system attitude recovery protocol is to first respond to an existing bank excursion beyond the bank "Safe Range" by providing visual and aural commands for returning the aircraft to wings level attitude. Then, should the pitch attitude be beyond the pitch "Safe Range", the system responds with visual and aural directives for pitch adjustments necessary to return the aircraft pitch to level flight. For example, during flight when both pitch and bank angles are simultaneously beyond 15° from their respective level flight attitudes, the system, employing both visual and aural commands, first directs the pilot in recovery procedures for reducing the bank excursion to within 5° of wings level, then issues the visual and aural commands necessary for the pilot to adjust aircraft pitch to complete the recovery to within 5° of pitch level flight.

It should be noted that, in some embodiments, a pitch stabilization index is provided. An example of such an index is depicted in FIG. 5, in which the index 160 is configured as a horizontal red line fixed at the instrument face center, referencing level, 0° pitch flight attitude. It should be noted that index 160 is not a horizon reference. The pitch stabilization index serves as a visual acquisition enhancer for locating 0° pitch attitude on the instrument display.

Attitude correction command windows 150 are configured as two adjacent, rectangular display windows, centered vertically and horizontally on the instrument face. In the embodiment of FIGS. 5-10, the windows are visible only when displaying attitude correction commands as a result of either pitch or bank exceeding design parameter limits. Attitude correction command windows can reduce conventional attitude indicator misinterpretation by providing immediate visual directives for returning the aircraft to wings and pitch level attitudes.

In some embodiments, attitude correction command windows display flashing visual directives "BANK LEFT" or "BANK RIGHT" whenever the aircraft's attitude is beyond 15° of bank. "BANK LEFT" directs the pilot to input left aileron controls to return the aircraft from a right hand bank to wings level. "BANK RIGHT" directs the pilot to input right aileron controls to return the aircraft from a left hand bank to wings level. Additionally or alternatively, the attitude correction command windows display flashing visual directives "PUSH FWD" or "PULL UP" whenever the aircraft's attitude is between 15° and 90° pitch up or pitch down. The "PUSH FWD" visual command directs the pilot to input forward elevator control to return the aircraft from a nose high pitch attitude towards level flight. The "PULL UP" visual command directs the pilot to input aft elevator control to return the aircraft from a nose low pitch attitude towards level flight.

In those embodiments incorporating voice command functionality, this provides pilots the unique and powerful capability to initiate recovery control inputs from an unanticipated attitude prior to and without visual acquisition of a flight attitude instrument, thus eliminating the prior art pilot requirements of addressing the initial four of five Time-Critical questions before the initial control inputs can be applied to affect an unanticipated attitude recovery. This capability effectively reduces pilot time-to-comprehension to near zero, greatly reducing recovery time and altitude loss while executing a recovery.

The voice commands can be configured to provide the appropriate aural attitude recovery commands whenever pitch exceeds 15° up or down, or bank exceeds 30° left or right. A pilot's near instantaneous reaction time to aural commands allows the pilot to immediately initiate appropriate control inputs as directed before visually comprehending the aircraft's attitude. In some embodiments, attitude recoveries are possible in response to voice commands only.

With respect to the voice command system, aural commands alert the pilot even when attention may be diverted away from flight instruments. Aural directives can activate simultaneously with and complement visual commands issued through the attitude correction command windows. For instance, when the command window displays the directive "BANK LEFT", the voice command system can issue one of the following aural commands: "Bank Left", when the bank status indicator is positioned, right, between 16° and 30°, inclusive; "Caution—Bank Left", when the bank status indicator is positioned, right, between 31° and 60°, inclusive; and "Warning—Bank Left—Now", when the bank status indicator is positioned, right, between 61° and 180°, inclusive.

When the command window displays the command "BANK RIGHT", the voice command system can issue one of the following aural commands: "Bank Right", when the bank status indicator is positioned, left, between 16° and 30°, inclusive; "Caution—Bank Right", when the bank status indicator is positioned, left, between 31° and 60°, inclusive; and "Warning—Bank Right—Now", when the bank status indicator is positioned, left, between 61° and 180°, inclusive.

When the command window displays the directive "PUSH FWD", the voice command system can issue one of the following aural commands: "Caution—Push Forward", when the pitch status indicator is positioned above the Pitch Stabilization Index between 16° and 30°, inclusive; "Warning—Push Forward—Now", when the pitch status indicator is positioned above the Pitch Stabilization Index between 31° and 90°, inclusive.

When the command window displays the directive "PULL UP", the voice command system can issue one of the following aural commands: "Caution—"Pull Up", when the pitch status indicator is positioned below the Pitch Stabilization Index between 16° and 30°, inclusive; "Warning—Pull Up—Now", when the pitch status indicator is positioned below the Pitch Stabilization Index between 31° and 90°, inclusive.

The aural command "Stop Turn" directs the pilot to roll the aircraft to 0° bank. The "Stop Turn" aural command is readied when the aircraft has exceeded 30° of bank and the pilot is banking the aircraft back towards a wings level attitude. When the aircraft bank returns to within 5° of wings level, the "Stop Turn" command is issued directing the pilot to position the ailerons control to roll the aircraft wings level, resulting in a 0° bank, wings level attitude.

Voice command system command "Stop Bank" directs the pilot to stop the bank attitude of the aircraft at 90° of bank. The "Stop Bank" aural command is readied when the aircraft has exceeded 30° of pitch and the pilot is directed via aural command to bank the aircraft to 90°. When the aircraft arrives at 80° of bank, the "Stop Bank" aural command is issued directing the pilot to position the ailerons control to stop the aircraft from banking further. The resulting bank will approximate 90°.

Voice command system command "Elevator Neutral" directs the pilot to neutralize the elevators control. The aural command "Elevator Neutral" is readied when the aircraft has exceeded 15° of pitch up or down and the pilot is flying the aircraft back towards a pitch level attitude. When the aircraft pitch returns to within 5° of level pitch, the "Elevator Neutral" aural command is issued directing the pilot to place the elevators control in the neutral or centered position causing the aircraft to pitch towards a 0° pitch, level flight attitude.

When yaw is in excess of ½° degree of center, the voice command system issues the command "Ball Left Out Of Limits" or "Ball Right Out Of Limits", as appropriate.

Additionally, when the pilot is knowledgeable of the bank and pitch limits that activate voice commands, upon hearing an aural pitch or bank command, the pilot may instantly know (even without looking at the display) that the pitch attitude has just exceeded 15° from level pitch or 30° of bank. This knowledge greatly reduces time-to-comprehension which instills pilot confidence and situational awareness during unanticipated attitude and/or spatial orientation event recoveries.

In all bank attitudes (including inverted), the visual and aural bank attitude correction directives indicate the shortest roll direction to return aircraft bank attitude to wings level.

When the pilot chooses to intentionally engage in aircraft maneuvering beyond the predefined limits and prefers to silence voice commands, the pilot may temporarily disarm the voice command system in some embodiments, such as by depressing an Audible Off actuator (e.g., a pushbutton, not shown). With voice commands disabled, visual commands still are provided. The voice command system may be rearmed at any time by depressing an associated actuator. In some embodiments, the voice command system automatically rearms after the aircraft has experienced flight within 30° of level bank attitude for a predetermined period (e.g., 2 minutes).

As best shown in FIGS. 7 and 8, a bank range indicator can be presented. Specifically, bank range indicator 170 includes arc segments that designate various bank angle ranges. Arc segment 172, designating a safe bank range, includes a green band, fixed in position on a 60° arc at the top of the instrument display, with 30° being located on each side of the bank stabilization index. Within the green band are located evenly spaced increments of 10° with extended indexes at 30° on both sides of the bank stabilization index. This provides a convenient visual reference to "standard" bank attitudes.

In this embodiment, the safe bank range is displayed at all times. Between 0° and 15° of bank in either direction, there are no visual or aural bank correction commands issued. Beyond 15° of bank, attitude bank correction commands "BANK LEFT" or "BANK RIGHT" are displayed. Aural commands are not issued until bank exceeds 30-degrees.

Arc segment 174, designating the caution bank range, includes a flashing yellow band, positioned at the perimeter near the top on each side of the instrument face between the 30° and 60° bank angle indexes. Within the yellow band are evenly spaced 10° increments. The caution bank range yellow band flashes while the bank status indicator is within the range of 31°-60° inclusive, either side of bank stabilization index, providing a visual warning of potentially dangerous bank attitudes.

Arc segment 176, designating a danger bank range, includes a flashing red band, positioned at the bottom perimeter of the instrument face between the left 60° bank angle index and the right 60° bank angle index, scaling along the perimeter corresponding with aircraft bank angle changes. The danger bank range red band flashes when aircraft bank attitude, either left or right, exceeds 60° and continues to flash until the bank status indicator moves into the caution bank range.

As the aircraft rolls left from 1° through 180° of bank (see, FIGS. 7 and 8), the bank status indicator opens the associated bank magnitude indicator such that a contrasting sector is displayed. When the bank angle exceeds 15°, the attitude correction command windows display the visual command "BANK RIGHT". When the bank exceeds 30°, the visual command is accompanied by the aural directive "Caution—Bank Right"; which is the shortest direction to bank to an upright, wings level attitude when the aircrafts bank attitude is between 1° and 180° of left bank.

As the aircraft's bank angle continues rotating left through 180° towards 360° of roll (see, FIG. 9), the bank status indicator and associated bank magnitude indicator transfer to the opposite side of the instrument display. Upon exceeding 180° of roll to the left, the aural command directive enunciates "Warning—Bank Left" and the attitude correction command windows display "BANK LEFT", continuing to direct the pilot to roll the aircraft in the shortest direction towards an upright, wings level attitude. The transition from one side of the instrument face to the other enables the bank magnitude indicator, attitude correction command windows and voice command system to always direct the pilot towards the shortest direction of rotation to an upright, zero-bank attitude.

As the aircraft rolls towards a wings level attitude, the bank magnitude indicator disappears from view in concert with bank status indicator movement towards the bank stabilization index.

Figure 10:
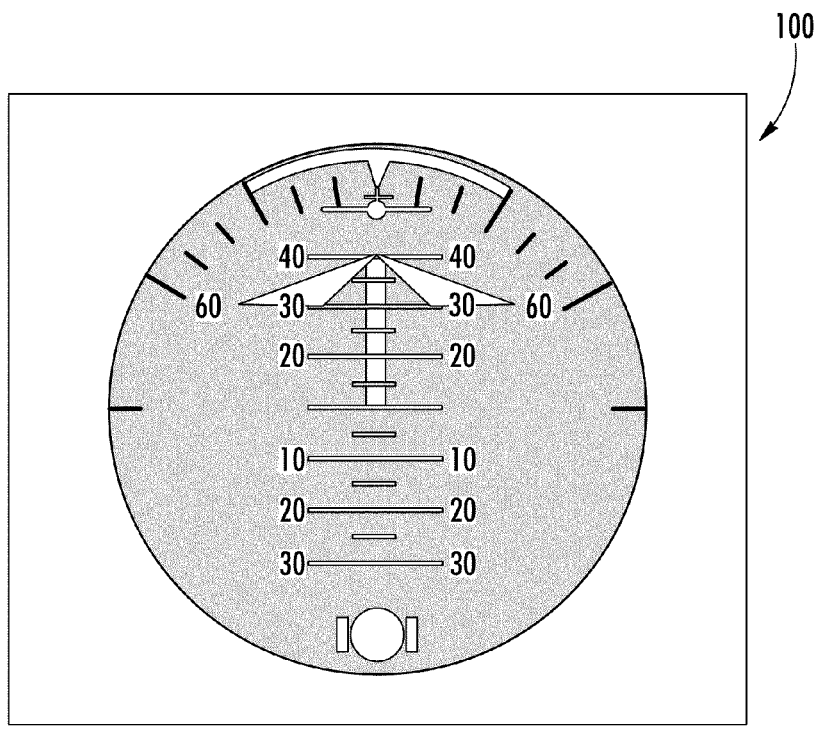

With respect to pitch deviations from 0° pitch angle, as aircraft pitch exceeds the predetermined range of static pitch angles (e.g., plus or minus 30°) displayed on the pitch angle scale, the associated half of the pitch angle scale can scroll to accommodate that motion. Such is depicted in FIG. 10, in which the pitch angle indicator has exceeded 30° nose up pitch and the positive half of the pitch angle scale has scrolled independent of the negative half of the scale in order to present a predetermined range of positive pitch angles centered about the current aircraft pitch angle.

With respect to attitude reverses (see, FIGS. 6 and 7), the pitch angle scale scrolls in the opposite direction returning to the default range of plus and minus 0° to 30°. The same logic applies when aircraft pitch attitude exceeds the 30° pitch down default limit.

Figure 11:
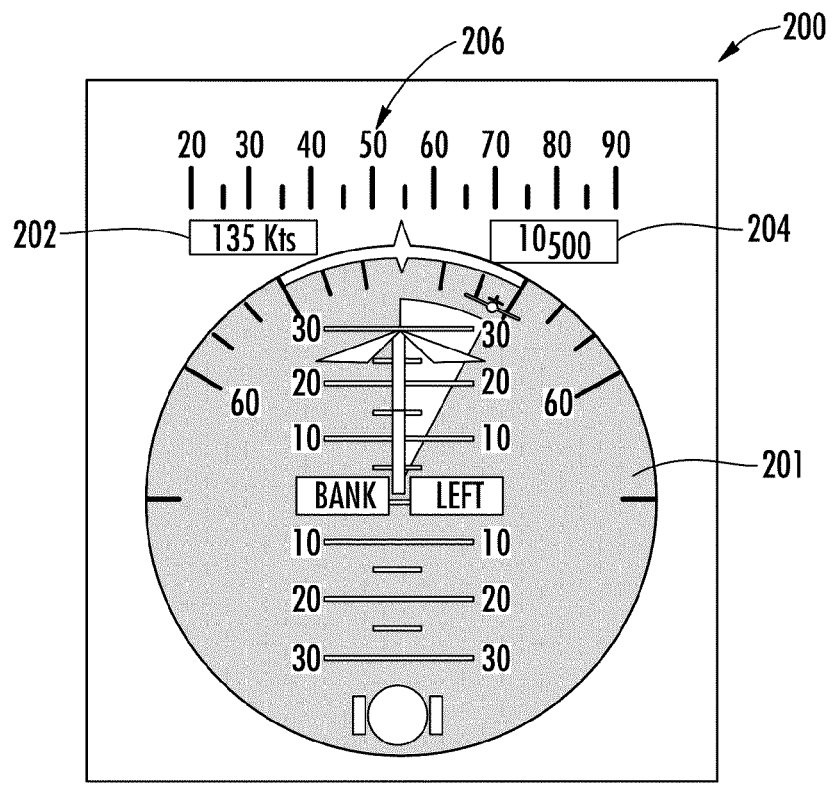
FIG. 11 schematically depicts another exemplary embodiment of an aircraft attitude system.

FIG. 11 depicts an exemplary embodiment of an aircraft attitude system configured as an Electronic Flight Instrument System (EFIS). Features similar to those described with respect to other embodiments will not be described again here; however, this embodiment incorporates several different features. By way of example, additional windows are provided. Specifically, system 200 includes a display panel 201 that is used to display an airspeed window 202 and an altitude window 204 with corresponding aircraft information. Additionally, a heading director 206 is provided for displaying heading information.

Figure 12:
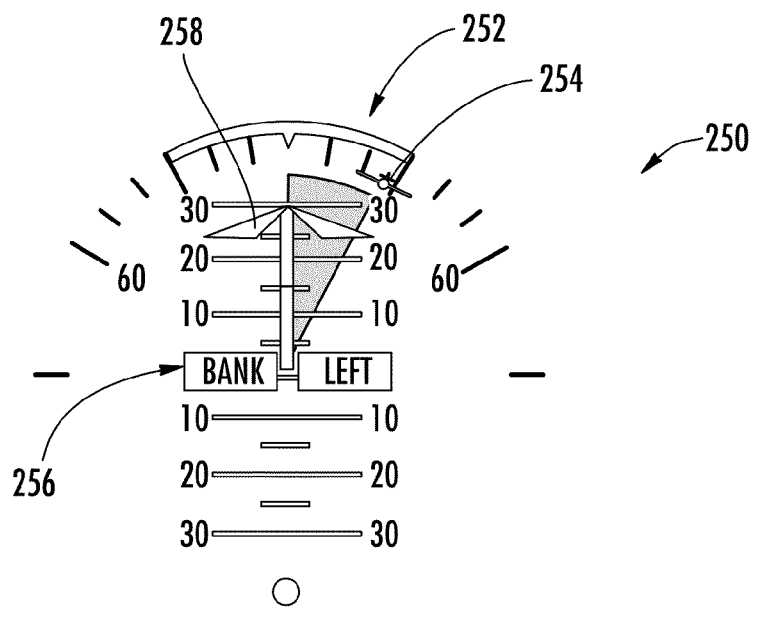
FIG. 12 schematically depicts an exemplary embodiment of an aircraft attitude system configured as a Heads-Up Display (HUD).

FIG. 12 depicts an exemplary embodiment of an aircraft attitude system configured as a Heads-Up Display (HUD). Features similar to those described with respect to other embodiments will not be described again here. As shown in FIG. 12, system 250 omits primary field graphics that are used for providing contrast in other embodiments to facilitate a higher percentage of transparency of the display. However, the display graphics presented in this embodiment includes a bank angle scale 252 and indicator 254, and a pitch angle scale 256 and indicator 258, among other features.

Figure 13:
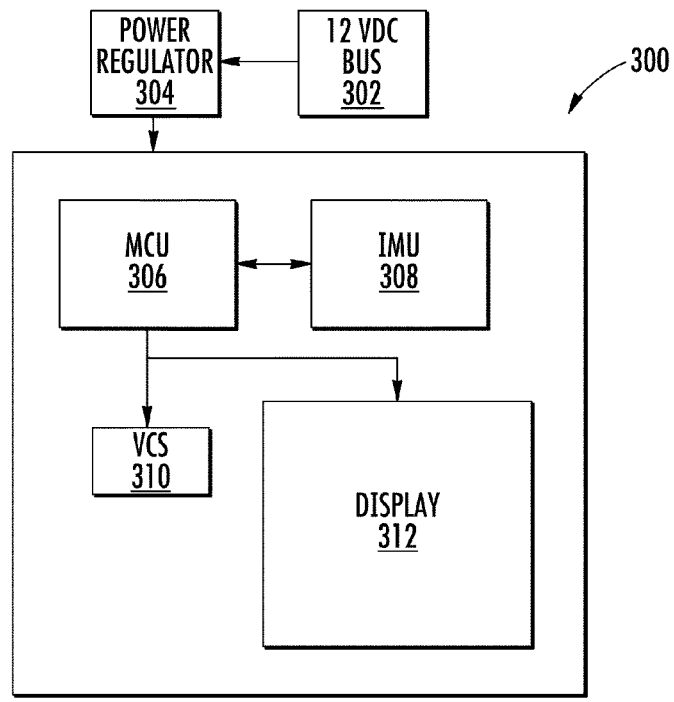
FIG. 13 schematically depicts an exemplary embodiment of an aircraft attitude system.

FIG. 13 is a schematic diagram depicting an exemplary embodiment of an aircraft attitude system. As shown in FIG. 13, system 300 is powered by aircraft power (e.g., 12 VDC bus power 302 that is passed through a power regulator 304 to insure stabilized, noise free power). The aircraft power is provided to a Microprocessor Unit (MCU) 306 that performs comparative calculations of aircraft real-time attitude information as collected by an Inertial Measurement Unit (IMU) 308. The IMU can be provided in various configurations and may include solid-state 3-axis accelerometers and solid-state 2-axis gyroscopes. Voice Command System (VCS) 310 issues aural directives responsive to signals from the MCU. Similarly, display 312 displays all instrument face static position fields and dynamically changing position fields responsive to signals from the MCU.

Figure 14:
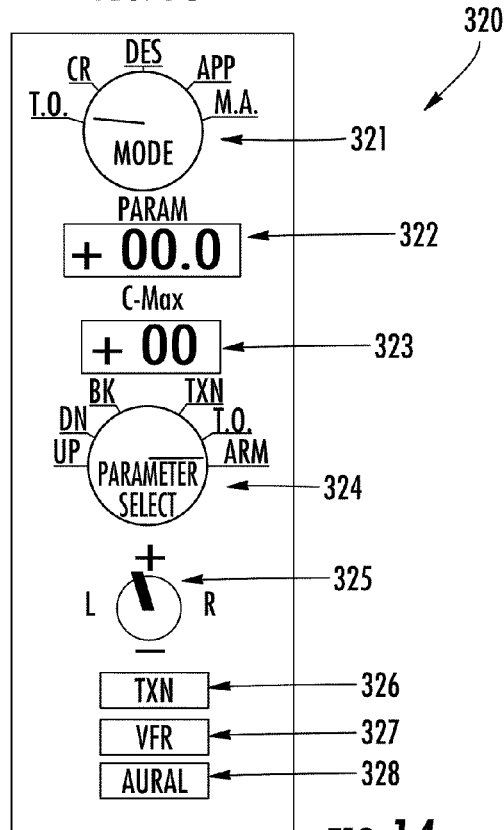
FIGS. 14-16 schematically depict an exemplary embodiment of an aircraft attitude system that incorporates pilot selectable parameters.
Figure 15:
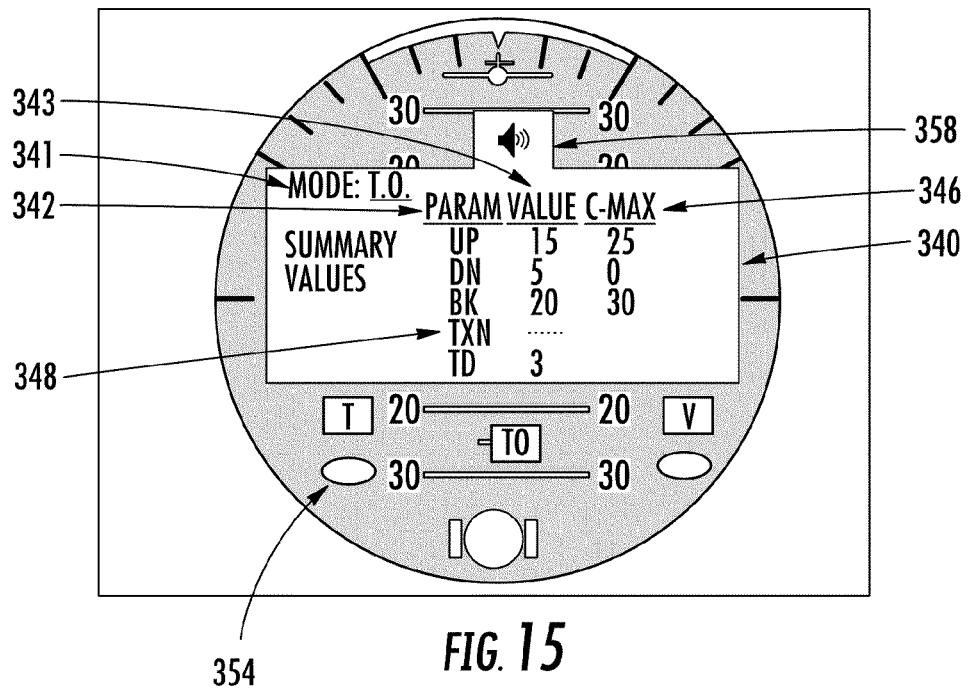
Figure 16:
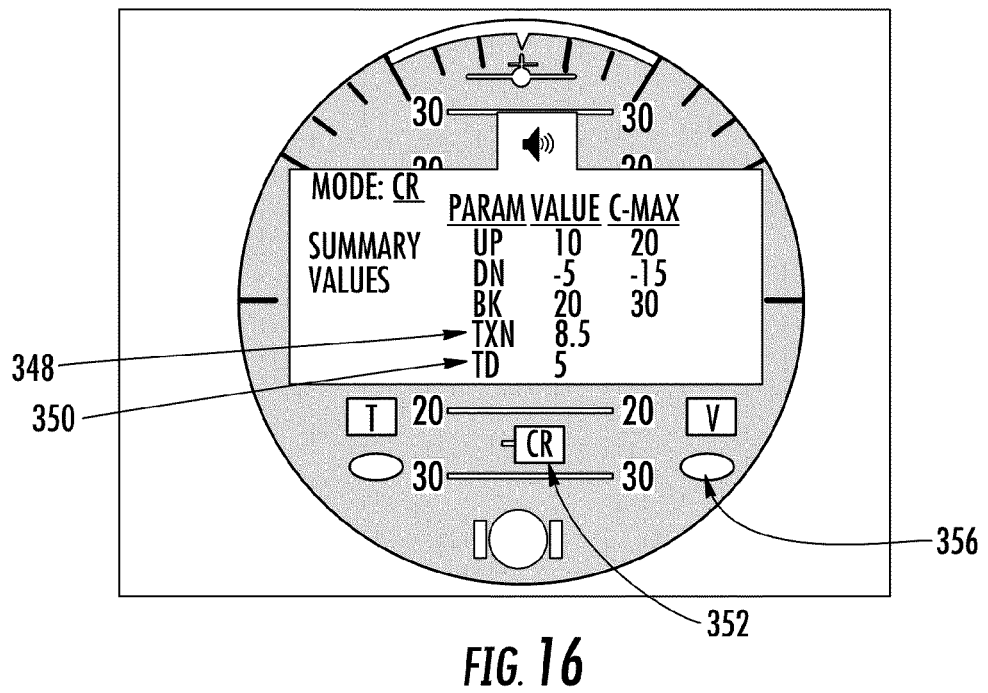

FIGS. 14-16 schematically depict an exemplary embodiment of an aircraft attitude system that incorporates pilot selectable parameters. As will be described in detail, pilot selectable parameters (PSP) protect the pilot from loss of situation awareness and the onset of spatial disorientation, and allow the pilot to personally select flight attitude warning parameters.

As shown in FIG. 14, an embodiment of a control unit is provided that is configured to accommodate parameter input and display system status. Specifically, control unit 320 incorporates a mode selector switch 321 (e.g., a 5-position switch), display windows 322, 323 (e.g., a 4-digit LED display window and a 3-digit LED display window), a parameter selection switch 324 (e.g., a 6-position switch), a toggle switch 325 (e.g., a 5-position switch), a transition Off/On button 326, an Emergency VFR On/Off button 327, and a Voice Command System Off/On button 328.

In this embodiment, the mode selector switch 321 has the following positions: T.O. (Takeoff), CR (Cruise), DES (Descent), APP (Approach), and MA (Missed Approach). The T.O. (Takeoff) position enables the pilot to enter tailored takeoff pitch, bank, and time delay warning parameters via parameter selection switch 324. By way of example, if the normal takeoff and climb-out pitch angle is a positive 15°, the pilot might enter a pitch down limit parameter of positive 5°, alerting him of an inadvertent decreasing flight angle during takeoff and climb-out.

The CR (Cruise) position enables the pilot to enter tailored cruise pitch, bank, transition altitude and time delay parameters via parameter selection switch 324. To transition from "T.O." mode to "CR" mode, the pilot has two options. The pilot can utilize the automatic "TXN" (Transition) feature, which transitions all parameters from T.O. mode to CR mode at the pilot selected altitude. Alternatively, mode selector switch 321 can be repositioned to "CR". When CR is selected, pilot pre-selected cruise boundaries for pitch, bank, transition altitude and time delay are activated.

The DES (Descent) position enables the pilot to enter tailored descent pitch, bank, transition and time delay parameters via mode selector switch 321. To transition from "CR" mode to "DES" mode, the pilot has two options. The pilot can utilize the automatic "TXN" (Transition) feature, which transitions all parameters from CR mode to DES mode at the pilot selected altitude. Alternatively, mode selector switch 321 can be repositioned to "DES". When "DES" is selected, pilot pre-selected descent boundaries for pitch, bank, transition altitude and time delay are activated.

Depressing the remote Emergency Descent button, which may be located remote from the control unit, overrides prior pilot selected descent mode parameters with system default emergency descent parameters and activates "DES" Mode. The system defined default parameters in this embodiment are 0° pitch up, 5° pitch down, 10° bank and 2-seconds time delay. These parameters profile the aircraft in a controllable descent. Use of this feature provides emergency descent assistance to VFR pilots, IFR pilots and non-pilot passengers who may be thrust into flying an aircraft because of an incapacitated pilot.

The APP (Approach) position enables the pilot to enter tailored approach pitch, bank, transition and time delay warning parameters via mode selector switch 321. To transition from "DES" mode to "APP" (Approach) mode, the pilot has two options. The pilot can utilize the automatic "TXN" (Transition) feature, which automatically transitions all parameters from DES mode to APP mode at the pilot selected altitude. Alternatively, mode selector switch 321 can be repositioned to "APP". When APP is selected, pilot pre-selected approach parameters for pitch, bank, transition altitude and time delay are activated.

The MA (Missed Approach) position enables the pilot to enter tailored missed approach pitch, bank, transition and time warning parameters via the Parameter Selector. To transition from "APP" mode to "MA" (Missed Approach) mode, the pilot has two options. The pilot can utilize the automatic "TXN" (Transition) feature, which transitions all parameters from APP mode to MA mode at the pilot selected altitude. Alternatively, mode selector switch 321 can be repositioned to "MA". When "MA" is selected, pilot pre-selected missed approach parameters for pitch, bank, transition altitude and time delay are activated.

Instrument approaches are flown in close proximity to the ground and demand precision course and altitude control. Therefore, it is paramount that the pilot be alerted promptly of possible spatial disorientation. For instance, a pilot may enter a Time-Delay of zero (0 sec) to trigger immediate activation of aural and visual command systems should an attitude excursion occur.

In this embodiment, parameter selection switch 324 provides six positions, UP, DN, BK, TXN, T.D. and ARM. Displayed values for selected parameters remain illuminated until parameter selection switch 324 is positioned to "ARM" (Armed) or until the default timer automatically arms the system. The "UP" position illuminates the two display windows 322, 323. Display window 322 is for input of the pilot selected maximum pitch up attitude, in degrees, that the aircraft can attain before the aural and/or visual warnings activate. Display window 322 is also used to enter the TXN altitude for the selected mode. Display window 323 is for input of the "C-Max" parameters, in degrees. Inputs are facilitated by cycling toggle switch 325 until the desired parameter value is displayed.

The "DN" position illuminates the display windows 322, 323. Display window 322 is for input of the pilot selected minimum pitch down attitude, in degrees, the aircraft can attain before the aural and visual warning and recovery display systems activate. This display is also used to enter the TXN altitude for the selected mode. Display window 323 is for input of the "DN", "C-Max" parameters, in degrees.

The "BK" position illuminates the display windows 322, 323. Display window 322 is for input of the pilot selected maximum bank attitude, in degrees, the aircraft can attain before the aural and visual warning and recovery display systems activate. This display is also used to enter the TXN altitude for the selected mode. The singular defined bank parameter is common to both left and right banks. Display window 323 is for input of the "BK", "C-Max" parameter, in degrees.

The "TXN" position illuminates only display window 322 for input of the pilot selected automatic mode transition altitude in thousands and hundreds of feet. At this altitude, a succeeding mode's parameters are activated. This capability allows the system to progressively and automatically switch between modes throughout the flight. For example, a pilot begins his flight in T.O. mode. If he knows that he will be leveling off and cruising at 8,500 feet, he can select the CR Mode and TXN Parameter and enter 8.5 in the display window. When the aircraft reaches 8.5 thousand feet, the CR Mode parameters will automatically be activated as if the pilot had manually turned the Mode Selector to CR. In addition, all pitch and bank color bands (see, FIG. 5) will be adjusted to reflect the new CR parameters.

Note that there is no entry for TXN in T.O. mode since flight always begins at ground level.

The "T.D." position illuminates only display window 322, which displays the pilot defined time delay, in seconds, before the voice and visual command systems activate. The Time Delay boundaries are 0-5 seconds. This feature suppresses false warnings during normal aircraft oscillations while flying through turbulent air.

The "ARM" position terminates pilot parameter selection, turns off the display windows and activates all aural and visual warning and recovery systems.

System maximum definable attitude boundaries can be, for example: Pitch Up=25°, Pitch Down=15°, Bank (left and right)=35°. The pilot may define any attitude up to and including these respective values. Note that these boundaries can be factory set dependent upon the performance capabilities of the specific aircraft.

If normal flight is disrupted by turbulence, or a pilot initiated maneuver causing the aircraft to exceed pilot defined attitude boundaries within one-half second, the pilot defined time delay parameter is automatically over-ridden, instantly activating voice and visual command systems. This feature immediately alerts the pilot if the aircraft rapidly departs controlled flight. Such an event could also occur as a result of wind shear, other aircraft vortices, and clear air turbulence, among others.

The 5-position toggle switch is spring centered to the Neutral/OFF position. The "+" position increments the digits of the display windows for each of the first five positions on parameter selection switch 324. The "−" decrements the digits for each of the first five positions on parameter selection switch 324. The "L" (Left) selects the respective data entry field to the left of the presently selected field or the next row up in the parameter summary window 340 (see FIGS. 15 and 16). The "R" (Right) selects the respective data entry field to the right of the presently selected field or the next row down in the parameter summary window.

Parameter summary window 340 opens when parameter selection switch 324 is moved out of the ARM position. MODE field 341 of window 340 displays the present position of the MODE switch, in the case of FIG. 15, "TO" (Take Off). The Param field 342 identifies the mode, whereas Value field 343 displays in degrees the previously pilot entered parameters for each of the parameter select positions of "UP", "DN", and "BK". The "TXN" values are in thousands of feet (above mean sea level), and "TD" values are in seconds. These values are changeable by the pilot, using the toggle switch.

In the T.O. MODE, the pilot can enter both positive and negative values for the "UP" and "DN" parameter positions. A negative value indicates a below level flight attitude. The "UP" position can contain a negative value and the DN position can contain a positive value. For example, the UP parameter could be set at positive 15° as the top boundary for the green segment on the pitch status indicator to warn of an unacceptable climb-out pitch up. The DN parameter could be set at positive 5° as the bottom boundary of the green segment to warn that the pitch has decreased to an unacceptable low pitch, thus preventing the inadvertent decrease in pitch to an unwanted descent on climb-out. The value "0" (zero) defines level pitch attitude.

In the "DES" (Descent) and "APP" (Approach) modes, the UP position can contain a negative value. For example, the DN parameter could be set at minus 15° as the maximum boundary for the green segment on the pitch status indicator to warn of an unacceptable descent pitch down. The Up parameter could be set at negative 5° as the minimum boundary of the green segment on the pitch status indicator to warn that the attitude has increased to an unacceptable higher pitch, thus preventing the inadvertent increase in pitch to an unwanted leveling off on a descent.

The "C-Max" (Caution Maximum) field 346 of the summary values window defines the boundaries for the Safe, Caution and Danger colored bank warning segments. The same boundary references apply to the pitch status indicator segments. Note that only UP, DN, and BK have "C-Max" values.

EXAMPLE 1

Referring to FIG. 15, the value shown for "Param" "Up" is 15. This value is entered in the top "Param" display window via the control unit with the Mode set to T.O. and parameter select position set to UP. This value creates the end boundary of positive 15° for the green (Safe) segment on the pitch status indicator. The beginning of the green (Safe) segment is "0"- level flight. This same value also defines the beginning boundary for the yellow (Caution) segment on the pitch status indicator.

The value displayed in the "C-Max" column for UP is 25. This value is entered in the bottom, "C-Max", display window with the MODE set to "T.O." and parameter select position set to "UP". After entering the desired parameter value in the Param display, toggling "R" moves control to the bottom, C-Max, display window. The value that defines the end boundary for the yellow (Caution) segment (C-Max) on the pitch status indicator is then entered. This same value also defines the beginning boundary for the red (Danger) segment on the pitch status indicator. The ending boundary for the Danger segment defaults to 90° pitch up.

The procedures for setting the "C-Max" parameters for parameter select position "DN" and "BK" are the same as described above.

EXAMPLE 2

Referring again to FIG. 15, "T.O." (Takeoff) MODE, the UP value is positive 15° pitch, which is the end boundary for the green segment, and the DN value is positive 5° pitch, which is the beginning boundary for the green segment. These settings ensure a continuous positive takeoff and climb attitude with the pitch being contained between 15° up and 5° pitch up (which also defines the Safe segment on the pitch status indicator). 15° also defines the beginning boundary of the yellow (Caution) segment on the pitch status indicator.

The value displayed in C-Max for DN is "0", which equates to level flight. This value is entered with the MODE set to "T.O." and the parameter select position set to "DN". After entering the desired value in the window, toggling "R" moves control to the "C-Max" entry window. The value that defines the bottom boundary of the yellow (Caution) segment (C-Max) on the pitch status indicator is then entered. This same value also defines the beginning boundary of the red (Danger) segment on the pitch status indicator, warning the pilot that any pitch angle below "0" results in a descending flight path. The ending value for the Danger segment defaults to 90° pitch down.

EXAMPLE 3

With continued reference to FIG. 15, the value displayed for Param BK (Bank) is 20. This value applies to both directions of bank. As with the UP and DN fields, the BK value of 20 defines the ending boundary of the green (Safe) warning segment and the beginning boundary of the yellow (Caution) warning segment. This value is entered with the MODE set to "T.O." and parameter select position set to "BK". After entering the desired value in the window, toggling "R" moves control to the "C-Max" entry window. The value that defines the end boundary of the yellow (Caution) warning band (C-Max) on the peripheral of the bank angle scale then is entered. This same value also defines the beginning boundary of the red (Danger) warning segment on the peripheral of the bank angle scale. The greatest value for the Danger warning segment defaults to 180°.

The "TXN" (Transition) field 348 of the parameter summary window displays the transition altitude for the selected mode. Note in FIG. 15 that there is no value for TXN in T.O. mode, since all take-offs begin at ground level. FIG. 16, which indicates Mode: CR (Cruise), shows a TXN value of 8.5, (8,500' mean sea level (msl)). 8.5 represents the altitude in this embodiment at which the system will automatically transition the Active Mode from T.O. mode to CR mode, replacing the T.O. mode parameters with the previously pilot selected CR mode parameters.

The "TD" field 350 displays the value in seconds of the time delay between when the aircraft attitude exceeds a pilot pre-selected parameter and when visual and voice commands and directives are activated.

The following additional features are provided in this embodiment: above the yaw deviation indicator, the Active MODE 352 is displayed, i.e. T.O., CR, DES, APP, and M.A.; a "T" red enunciator 354 illuminates when "automatic transition" is manually deactivated via the TXN button; a "V" red enunciator 356 illuminates when Emergency VFR capability is manually deactivated via the VFR button; a red speaker enunciator 358 illuminates when the voice command system is manually deactivated via the AURAL button.

When the aircraft electrical master is switched "On", this embodiment automatically activates and performs a system self-test and all parameters default to the previous flight's parameters for each mode. To ensure the system is properly configured for takeoff, the Active Mode defaults to "T.O." regardless of the position of the mode selector switch 321 and parameter selector switch 324. The "Active Mode" window defaults to "T.O.". The Voice Command System defaults to "ON". Automatic transition is activated, and the control unit is activated.

Regardless of the selected mode position, if the aircraft lands and subsequently takes off without turning off the electrical system, and the system detects a lack of aircraft physical movement for at least one minute, the system defaults to T.O. mode with the prior flight's T.O. mode parameter settings.

Should the pilot prefer to takeoff in other than the defaulted T.O. mode, the mode selector switch can be positioned to any mode and returned to a preferred mode.

To modify mode settings, first select the mode to be modified, select the desired pitch, bank, transition or time delay position using the parameter selector switch. Positioning the parameter selector switch out of the ARM position illuminates the displays windows. Each parameter selector switch position displays the previous value entered for that parameter and retains that value unless changed. The displayed value may be changed using the Toggle +/− switch. Digits are incremented by the momentary "+" position. The center position is neutral/"OFF". The momentary "−" position decrements the digits. Toggle "L" or "R" to move to the next entry field.

After the pilot selected parameter values have been entered for the selected mode, the mode selector switch can be repositioned to another mode for parameter modification using the same procedure.

After the modes have been defined, the parameter selector switch is positioned to "ARM". The two display windows are turned off signifying that the system is armed. If more than 30 seconds elapses between parameter entries, the system automatically arms.

The visual and voice command systems activate when the aircraft's attitude exceeds the pilot pre-selected attitude boundaries for a time period that exceeds the pilot pre-selected time delay and will remain activated until the aircraft's attitude returns to within pilot pre-selected parameters. The "AURAL" pushbutton switch temporarily disarms and rearms the voice command system. When the pilot chooses to intentionally engage in aircraft maneuvering beyond pilot pre-selected parameters and prefers to silence aural commands, the pilot may temporarily disarm the voice command system by depressing the AURAL pushbutton—the voice command system is disabled, but the visual warning and recovery features of the system remain active.

The voice command system may be rearmed at any time by depressing the AURAL pushbutton a second time. The voice command system is automatically rearmed after the aircraft has experienced flight within the pilot defined pitch and bank attitude boundaries for a period of 2 minutes in this embodiment.

It should be noted that various components other than those specifically set forth can be used to perform the described functions. By way of example, a graphical user interface can be used to receive parameter inputs instead of manual switches.

Additional information on aircraft systems that include recovery functionality may be found in U.S. patent application Ser. No. 12/758,903, filed Apr. 13, 2010, which claims the benefit of and priority to U.S. Provisional Patent applications 61/171,103, filed Apr. 21, 2009, and 61/309,579, filed Mar. 2, 2010. Each of these aforementioned applications is incorporated by reference herein in its entirety.

Clearly, various functionalities described above can be implemented in hardware and/or software. In this regard, a computing device can be used to implement various functionalities, such as those described with respect to the various figures.

In terms of hardware architecture, such a computing device can include a processor, memory, and one or more input and/or output (I/O) device interface(s) that are communicatively coupled via a local interface. The local interface can include, for example but not limited to, one or more buses and/or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

The processor may be a hardware device for executing software, particularly software stored in memory. The processor can be a custom made or commercially available processor, a central processing unit (CPU), an auxiliary processor among several processors associated with the computing device, a semiconductor based microprocessor (in the form of a microchip or chip set) or generally any device for executing software instructions.

The memory can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory may incorporate electronic, magnetic, optical, and/or other types of storage media. Note that the memory can also have a distributed architecture, where various components are situated remotely from one another, but can be accessed by the processor.

The software in the memory may include one or more separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

The Input/Output devices that may be coupled to system I/O Interface(s) may include input devices, for example but not limited to, a keyboard, mouse, scanner, microphone, camera, proximity device, etc. Further, the Input/Output devices may also include output devices, for example but not limited to, a printer, display, etc. Finally, the Input/Output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

When the computing device is in operation, the processor can be configured to execute software stored within the memory, to communicate data to and from the memory, and to generally control operations of the computing device pursuant to the software. Software in memory, in whole or in part, is read by the processor, perhaps buffered within the processor, and then executed.

With respect to specific functionality, computer implemented instructions can be configured to compare sensed aircraft attitude (including timing of various events) to a database of predetermined aircraft attitude limits. Upon detecting that a threshold of at least one of the limits has been attained, a response to such correlation can be executed. The response also can be drawn from a database of such responses, such as those associated with flight control input directives and/or information to be displayed as one of ordinary skill would readily understand.

One should note that any of the functionality described herein can be embodied in a computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a computer readable medium can be, for example but not limited to, an electronic, magnetic, optical, electromagnetic, infrared, or semiconductor system, apparatus, or device. More specific examples (a non-exhaustive list) of a computer-readable medium include a portable computer diskette (magnetic), a random access memory (RAM) (electronic), a read-only memory (ROM) (electronic), an erasable programmable read-only memory (EPROM or Flash memory) (electronic), and a portable compact disc read-only memory (CDROM) (optical).

It should be emphasized that the above-described embodiments are merely possible examples of implementations set forth for a clear understanding of the principles of this disclosure. Many variations and modifications may be made to the above-described embodiments without departing substantially from the spirit and principles of the disclosure. By way of example, pitch and bank attitudes and limits depicted and capabilities descriptions are not to be considered limitations. Actual instrument implementation may accommodate custom aircraft type and flight performance criteria. Additionally, attitude correction directives and voice commands depicted and capabilities descriptions are not to be considered limitations. Actual instrument implementation may accommodate custom terminology and language criteria. All such modifications and variations are intended to be included herein within the scope of this disclosure and protected by the accompanying claims.

The invention claimed is:

1. An aircraft attitude system comprising:
an instrument face having a bank angle scale, a bank status indicator, a pitch angle scale and a pitch status indicator;
the bank angle scale being fixed in position relative to the instrument face and being operative to present increments of bank angle of an aircraft;
the bank status indicator being operative to move relative to the bank angle scale such that a current aircraft bank angle is indicated;
the pitch angle scale being in a vertical orientation relative to the instrument face and being operative to present increments of pitch angle of an aircraft;
the pitch status indicator being operative to move relative to the pitch angle scale such that a current aircraft pitch angle is indicated;
wherein the pitch status indicator comprises a pitch deviation guide, the pitch deviation guide being configured as an extendable tape originating in a vicinity of 0° pitch angle on the pitch angle scale and terminating in a vicinity of the pitch status indicator such that a length of the pitch deviation guide changes responsive to changes in aircraft pitch.

2. The system of claim 1, wherein:
the bank angle scale defines, at least in part, a first perimeter of the instrument face; and
the pitch angle scale is positioned within the first perimeter.

3. The system of claim 1, wherein the pitch angle scale is operative to scroll responsive to aircraft pitch changes such that a range of pitch angles centered about the current aircraft pitch angle is presented.

4. The system of claim 1, wherein the pitch status indicator comprises a chevron having an apex, the apex being operative to indicate the current aircraft pitch angle along the pitch angle scale.

5. The system of claim 1, wherein the instrument face lacks an artificial horizon.

6. The system of claim 1, further comprising a bank magnitude indicator configured as an extendable sector, with a first radius of the sector being located in a vicinity of 0° bank angle on the bank angle scale and a second radius of the sector being located in a vicinity of the current aircraft bank angle along the bank angle scale.

7. The system of claim 6, wherein:
the first radius and the second radius of the bank magnitude indicator are presented responsive to a deviation of the current aircraft bank angle from a predetermined bank angle; and
when so presented, at least a portion of the sector defined by the first radius and the second radius exhibits a contrasting color with respect to a color of the instrument face.

8. The system of claim 1, further comprising a yaw deviation indicator operative to display a deviation of the current aircraft yaw angle from a predetermined yaw angle.

9. The system of claim 1, further comprising:
an inertial measurement unit (IMU) operative to provide information corresponding to aircraft attitude; and
a microprocessor unit (MCU) operative to receive the information corresponding to the aircraft attitude and to determine whether the aircraft attitude is within predefined limits.

10. The system of claim 9, further comprising an attitude correction command window communicating with the MCU and operative to display recommended flight control inputs to return the aircraft to within the predefined limits.

11. The system of claim 9, wherein the system includes multiple modes, with each of the modes having an associated set of predefined limits.

12. The system of claim 9, further comprising a voice command system communicating with the MCU and operative to provide aural directives corresponding to recommended flight control inputs to return the aircraft to within the predefined limits.

13. The system of claim 12, wherein the aural directives provided by the VCS enable the aircraft to be recovered to within the predefined limits without using visual information provided by flight instruments.

14. The system of claim 9, wherein the predefined limits are manually adjustable limits.

15. The system of claim 14, further comprising a control unit operative to receive parameters for setting the predefined limits.

16. An aircraft attitude system comprising:
an inertial measurement unit (IMU) operative to provide information corresponding to aircraft attitude;
a microprocessor unit (MCU) operative to receive the information corresponding to the aircraft attitude and to determine whether the aircraft attitude is within predefined limits;
a voice command system (VCS) having a speaker, the VCS being operative to issue aural directives via the speaker responsive to signals from the MCU, the aural directives providing real-time flight control input directives to return the aircraft to an attitude within the predefined limits; and
an instrument face having a bank angle scale, a bank status indicator, a pitch angle scale and a pitch status indicator;
the bank angle scale being fixed in position relative to the instrument face and being operative to present increments of bank angle of an aircraft;
the bank status indicator being operative to move relative to the bank angle scale such that a current aircraft bank angle is indicated;
the pitch angle scale being in a vertical orientation relative to the instrument face and being operative to present increments of pitch angle of an aircraft;
the pitch status indicator being operative to move relative to the pitch angle scale such that a current aircraft pitch angle is indicated;
wherein the pitch status indicator comprises a pitch deviation guide, the pitch deviation guide being configured as an extendable tape originating in a vicinity of 0° pitch angle on the pitch angle scale and terminating in a vicinity of the pitch status indicator such that a length of the pitch deviation guide changes responsive to changes in aircraft pitch.

17. The system of claim 16, wherein the aural directives provided by the VCS enable the aircraft to be recovered to within the predefined limits without using visual information provided by flight instruments.

18. A method for facilitating recovery of aircraft attitude comprising:
analyzing aircraft attitude with an inertial measurement unit (IMU);
providing aircraft attitude from the IMU to a microprocessor unit (MCU), wherein the MCU is operative to determine whether the aircraft attitude is within predefined limits;
displaying an instrument face including a bank angle scale, a bank status indicator, a pitch angle scale and a pitch status indicator; the bank angle scale being fixed in position relative to the instrument face and being operative to present increments of bank angle of the aircraft; the bank status indicator being operative to move relative to the bank angle scale such that a current aircraft bank angle is indicated; the pitch angle scale being in a vertical orientation relative to the instrument face and being operative to present increments of pitch angle of an aircraft; the pitch status indicator being operative to move relative to the pitch angle scale such that a current aircraft pitch angle is indicated; the pitch status indicator comprising a pitch deviation guide, the pitch deviation guide being configured as an extendable tape originating in a vicinity of 0° pitch angle on the pitch angle scale and terminating in a vicinity of the pitch status indicator such that a length of the pitch deviation guide changes responsive to changes in aircraft pitch; and
providing aural directives, responsive to information provided by the MCU, associated with real-time flight control input recommended to return the aircraft to an attitude within the predefined limits such that recovering the aircraft to within the predefined limits is enabled without reference to an artificial horizon.

19. The method of claim 18, wherein the providing of aural directives enables the aircraft to be recovered to within the predefined limits without using visual information provided by flight instruments.

20. An aircraft attitude system comprising:
an instrument face having a bank angle scale, a bank status indicator, a pitch angle scale, a pitch status indicator and a bank magnitude indicator;
the bank angle scale being fixed in position relative to the instrument face and being operative to present increments of bank angle of an aircraft;
the bank status indicator being operative to move relative to the bank angle scale such that a current aircraft bank angle is indicated;
the pitch angle scale being in a vertical orientation relative to the instrument face and being operative to present increments of pitch angle of an aircraft;
the pitch status indicator being operative to move relative to the pitch angle scale such that a current aircraft pitch angle is indicated;
the bank magnitude indicator being configured as an extendable sector, with a first radius of the sector being located in a vicinity of 0° bank angle on the bank angle scale and a second radius of the sector being located in a vicinity of the current aircraft bank angle along the bank angle scale.

21. The system of claim 20, wherein:
the first radius and the second radius of the bank magnitude indicator are presented responsive to a deviation of the current aircraft bank angle from a predetermined bank angle; and
when so presented, at least a portion of the sector defined by the first radius and the second radius exhibits a contrasting color with respect to a color of the instrument face.

22. The system of claim 20, wherein the pitch status indicator comprises a pitch deviation guide, the pitch deviation guide being configured as an extendable tape originating in a vicinity of 0° pitch angle on the pitch angle scale and terminating in a vicinity of the apex such that a length of the pitch deviation guide changes responsive to changes in aircraft pitch.

23. The system of claim 20, wherein the instrument face lacks an artificial horizon.

24. The system of claim 20, wherein the system includes multiple modes, with each of the modes having an associated set of predefined limits.

25. The system of claim 24, further comprising a voice command system communicating operative to provide aural directives corresponding to recommended flight control inputs to return the aircraft to within the predefined limits.

26. The system of claim 25, wherein the aural directives enable the aircraft to be recovered to within the predefined limits without using visual information provided by flight instruments.

27. The system of claim 24, wherein the predefined limits are manually adjustable limits.

28. An aircraft attitude system comprising:
an inertial measurement unit (IMU) operative to provide information corresponding to aircraft attitude;

a microprocessor unit (MCU) operative to receive the information corresponding to the aircraft attitude and to determine whether the aircraft attitude is within predefined limits;

a voice command system (VCS) having a speaker, the VCS being operative to issue aural directives via the speaker responsive to signals from the MCU, the aural directives providing real-time flight control input directives to return the aircraft to an attitude within the predefined limits; and an instrument face having a bank angle scale, a bank status indicator, a pitch angle scale, a pitch status indicator and a bank magnitude indicator;

the bank angle scale being fixed in position relative to the instrument face and being operative to present increments of bank angle of an aircraft;

the bank status indicator being operative to move relative to the bank angle scale such that a current aircraft bank angle is indicated;

the pitch angle scale being in a vertical orientation relative to the instrument face and being operative to present increments of pitch angle of an aircraft;

the pitch status indicator being operative to move relative to the pitch angle scale such that a current aircraft pitch angle is indicated;

the bank magnitude indicator being configured as an extendable sector, with a first radius of the sector being located in a vicinity of 0° bank angle on the bank angle scale and a second radius of the sector being located in a vicinity of the current aircraft bank angle along the bank angle scale.

29. The system of claim 28, wherein the aural directives provided by the VCS enable the aircraft to be recovered to within the predefined limits without using visual information provided by flight instruments.

30. A method for facilitating recovery of aircraft attitude comprising:

analyzing aircraft attitude with an inertial measurement unit (IMU);

providing aircraft attitude from the IMU to a microprocessor unit (MCU), wherein the MCU is operative to determine whether the aircraft attitude is within predefined limits;

displaying an instrument face including a bank angle scale, a bank status indicator, a pitch angle scale, a pitch status indicator and a bank magnitude indicator; the bank angle scale being fixed in position relative to the instrument face and being operative to present increments of bank angle of the aircraft; the bank status indicator being operative to move relative to the bank angle scale such that a current aircraft bank angle is indicated; the pitch angle scale being in a vertical orientation relative to the instrument face and being operative to present increments of pitch angle of an aircraft; the pitch status indicator being operative to move relative to the pitch angle scale such that a current aircraft pitch angle is indicated; the bank magnitude indicator being configured as an extendable sector, with a first radius of the sector being located in a vicinity of 0° bank angle on the bank angle scale and a second radius of the sector being located in a vicinity of the current aircraft bank angle along the bank angle scale; and providing aural directives, responsive to information provided by the MCU, associated with real-time flight control input recommended to return the aircraft to an attitude within the predefined limits such that recovering the aircraft to within the predefined limits is enabled without reference to an artificial horizon.

31. The method of claim 30, wherein the providing of aural directives enables the aircraft to be recovered to within the predefined limits without using visual information provided by flight instruments.

* * * * *